Sept. 12, 1950 C. RAY ET AL 2,521,996
CARTON OPENING MACHINE
Filed July 29, 1947 6 Sheets-Sheet 2
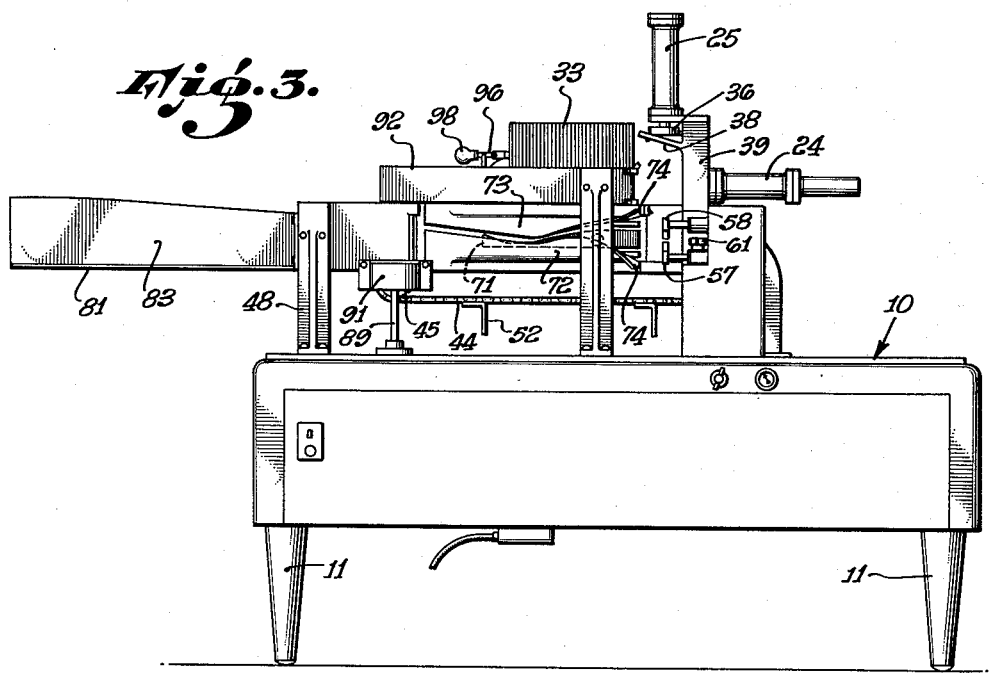
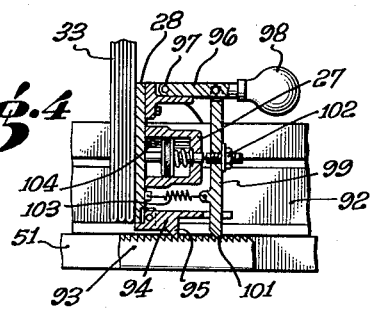
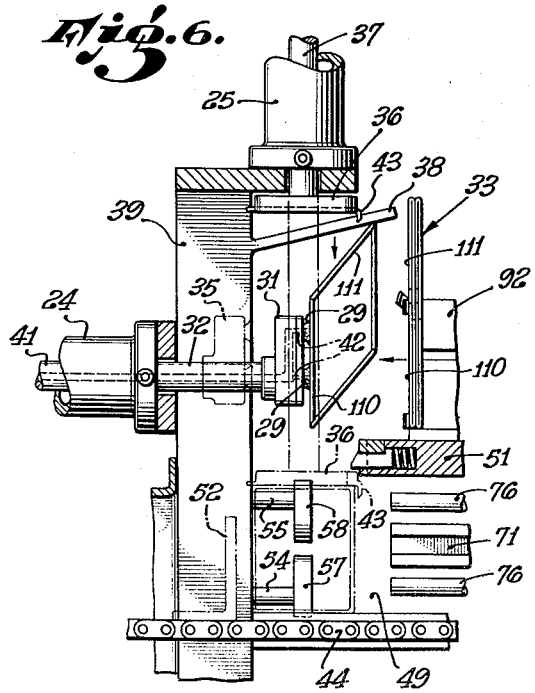
CARLO RAY,
DON RAY,
INVENTORS
ATTORNEY.

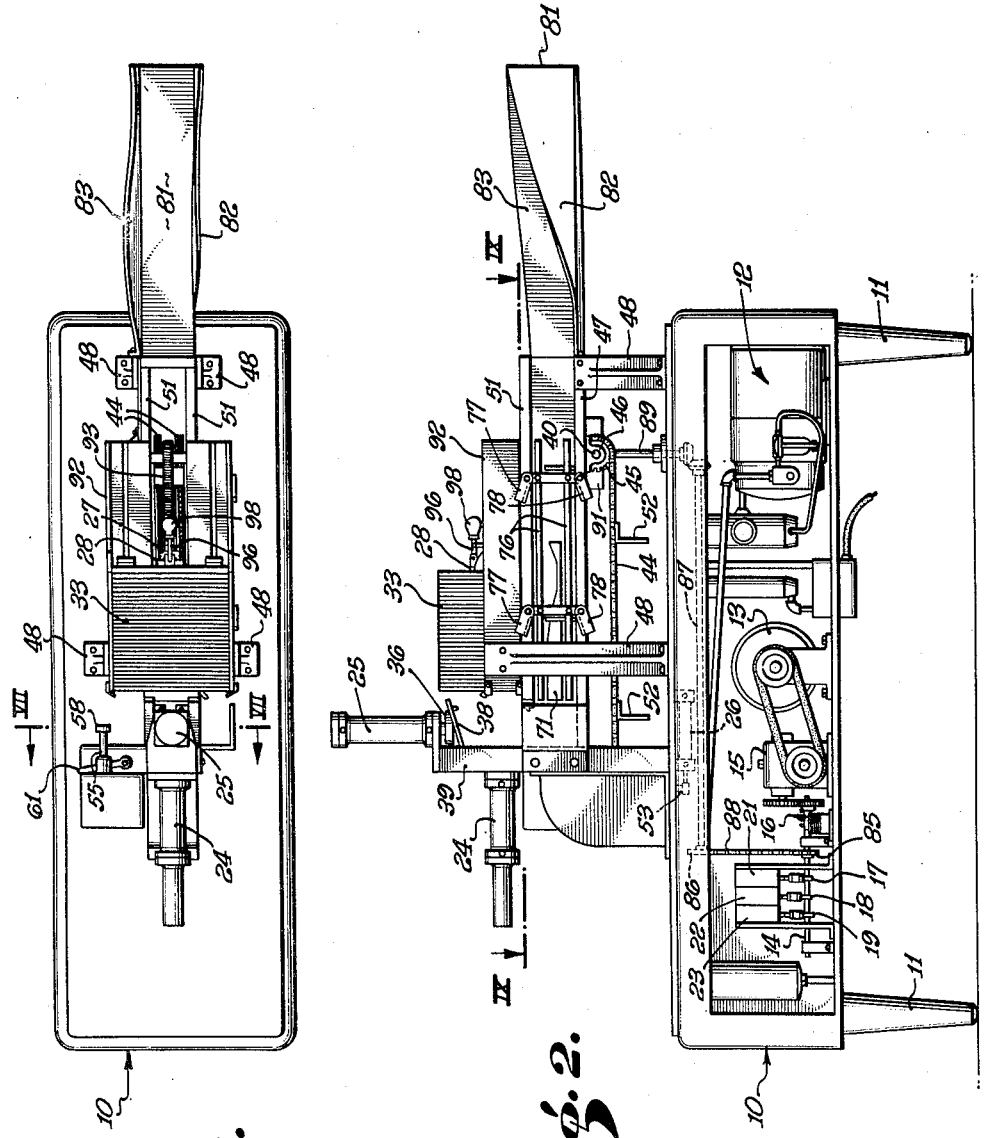

Sept. 12, 1950         C. RAY ET AL         2,521,996
                   CARTON OPENING MACHINE
Filed July 29, 1947                    6 Sheets-Sheet 3

CARLO RAY,
DON RAY,
  INVENTORS.

BY
   ATTORNEY.

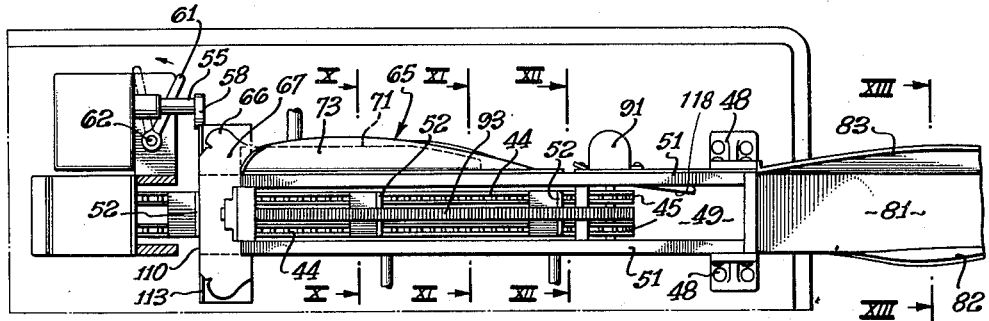
Fig. 9.
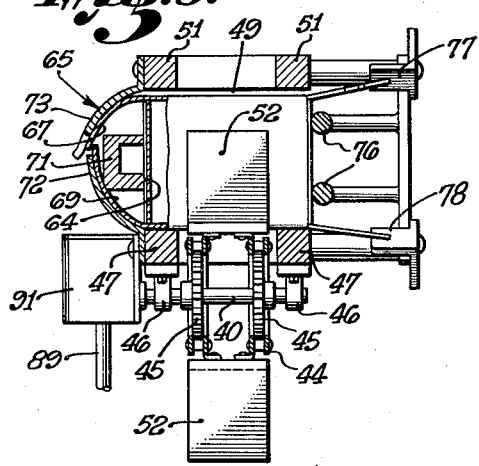
Fig. 10.
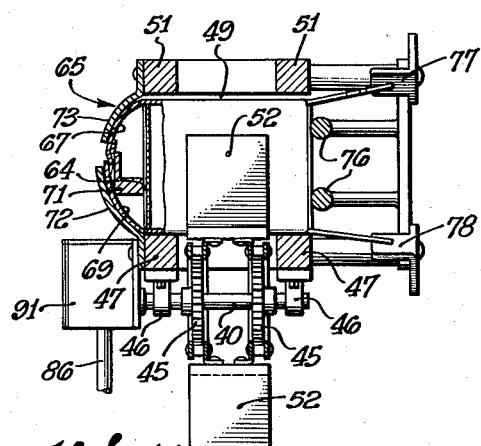
Fig. 11.
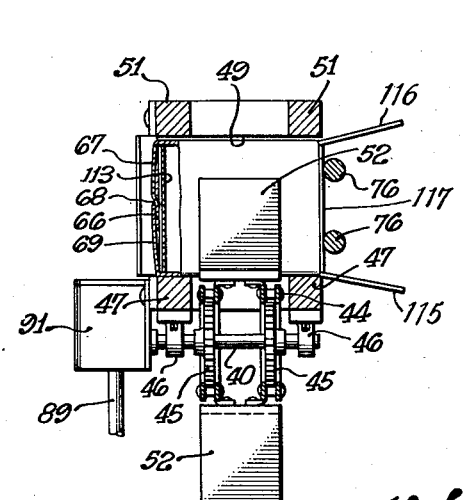
Fig. 12.
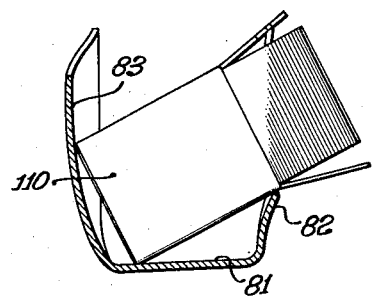
Fig. 13.
CARLO RAY,
DON RAY,
INVENTORS.
By 
ATTORNEY.

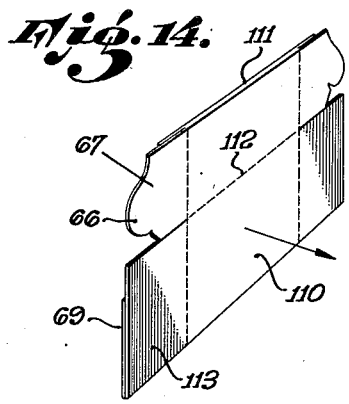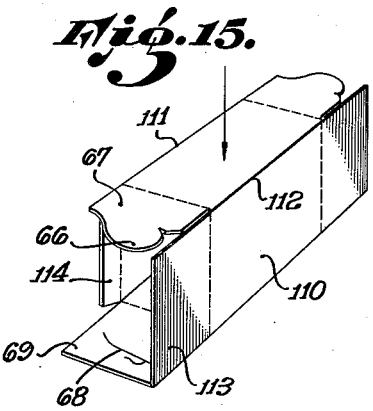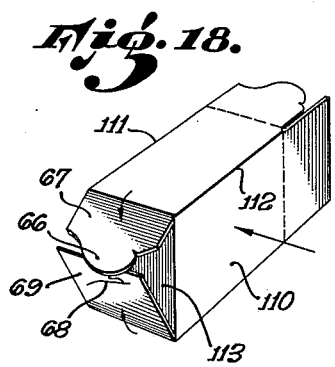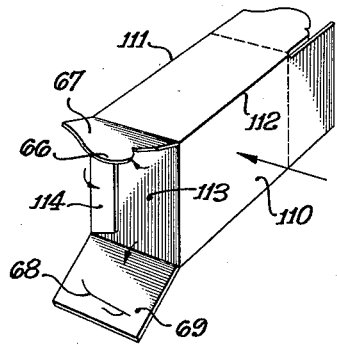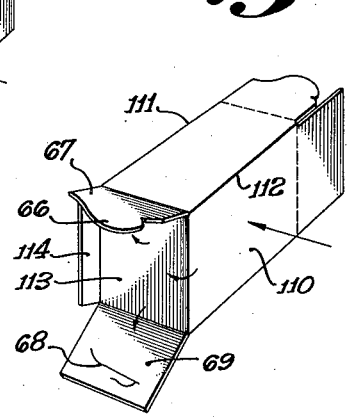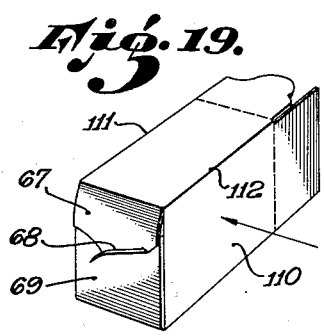

Sept. 12, 1950 C. RAY ET AL 2,521,996
CARTON OPENING MACHINE
Filed July 29, 1947 6 Sheets-Sheet 6
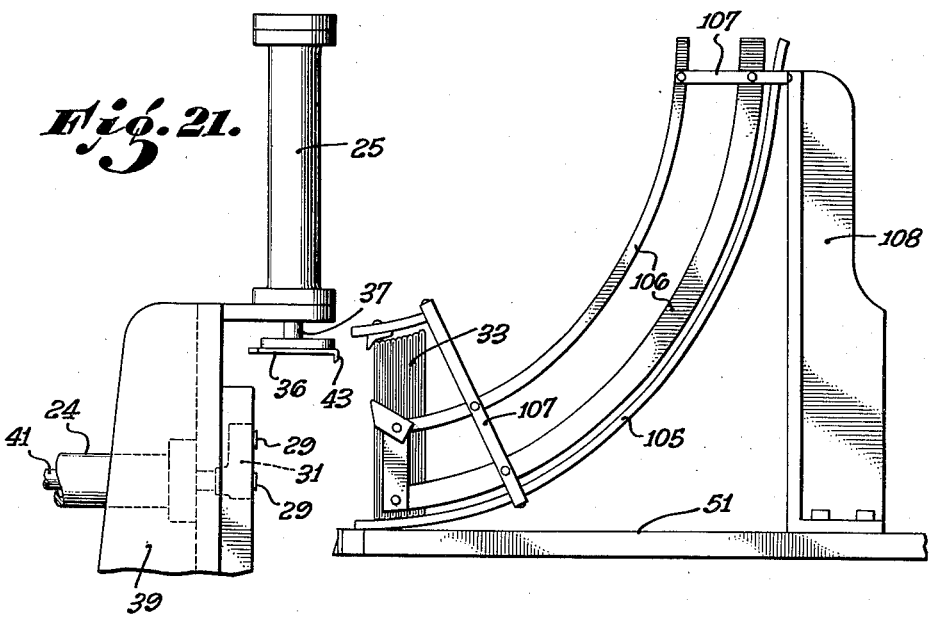
Fig. 21.
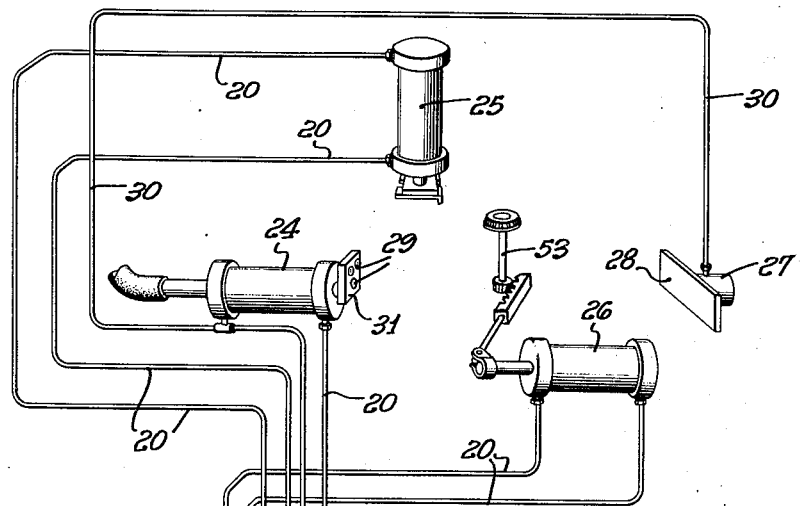
Fig. 20.
CARLO RAY,
DON RAY,
INVENTORS,
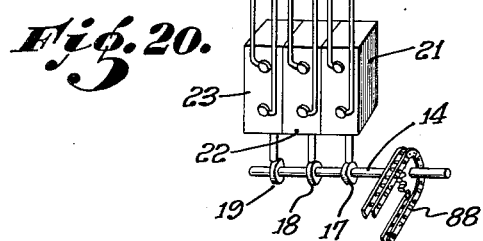
ATTORNEY.

Patented Sept. 12, 1950

2,521,996

UNITED STATES PATENT OFFICE 2,521,996

CARTON OPENING MACHINE

Carlo Ray, North Hollywood, and Don Ray, Beverly Hills, Calif.

Application July 29, 1947, Serial No. 764,452

14 Claims. (Cl. 93—53)

This invention relates to a carton-opening machine and, more particularly, to a machine for setting up collapsed cartons used in connection with automatic carton-filling machines, such as in the production of packaged ice cream.

Prior machines for setting up collapsed cartons were directed to the manipulation of flaps that form the end colsure of the carton and which required the use of glue or other flap-sealing means. Cartons that require glue or other adhesive means are not practical in the packaging of ice cream and other moisture-containing foodstuffs, and it is desired to use flaps having interlocking tabs and slits that will satisfactorily form the closure without the need of adhesive substances. On account of space, most cartons are supplied in a knock-down, folded or collaped condition, and where large production is required, such as in the packaging of ice cream, too much time is involved in the manual forming of containers. These cartons are preformed, and each collapsed carton consists of four sides, each side having a flap extending from its ends. The carton is folded so that two pairs of congruent flaps are disposed in parallel relation and the congruent sides of each pair lying in the same plane.

It is, therefore, a primary object of this invention to provide a machine that will automatically open collapsed cartons, one by one, in a positive and accurate manner without damage to the cartons, and which will be positively in control of the carton during the forming or opening operations.

Another object is to provide a carton-opening machine that will operate to open or square a collapsed carton and fold and interlock the flaps to close the end of the carton.

Another object is to provide a machine having the above characteristics that will operate to provide a single formed carton or any number of cartons in sequence.

Another object is to provide a machine having the above characteristics that will operate to positively break the elasticity of the folds or scores defining the flaps so that they will lie in properly aligned position and without any tendency of displacement due to the integral connection of the flap with the body of the carton.

A further object is to provide a carton-forming machine that will be positive in action so that the risk of accidental spoilage of cartons, with consequent interruption of the operations of the machine as a whole, is avoided.

The above and other objects will be made apparent throughout the further description of the invention when taken in connection with the accompanying drawings, wherein like reference characters refer to like parts. It is to be distinctly understood that the drawings are not a definition of the invention but merely illustrate a preferred form by means of which the invention may be effectuated.

In the drawings:

Fig. 1 is a top plan view of a carton-opening machine embodying the invention.

Fig. 2 is an elevational view of one side of Fig. 1.

Fig. 3 is an elevational view of the other side of Fig. 1.

Fig. 4 is a vertical, sectional view of an air-operated follower embodied in the invention shown in normal position.

Fig. 5 is a view similar to Fig. 4 showing the follower with air pressure applied to the cylinder.

Fig. 6 is an enlarged detail view in section showing the initial step of the carton-opening mechanism.

Fig. 9 is a sectional view taken along the line IX—IX of Fig. 2.

Fig. 10 is a sectional view taken along the line X—X of Fig. 9.

Fig. 11 is a sectional view taken along the line XI—XI of Fig. 9.

Fig. 12 is a sectional view taken along the line XII—XII of Fig. 9.

Fig. 13 is a sectional view taken along the line XIII—XIII of Fig. 9.

Figure 7:
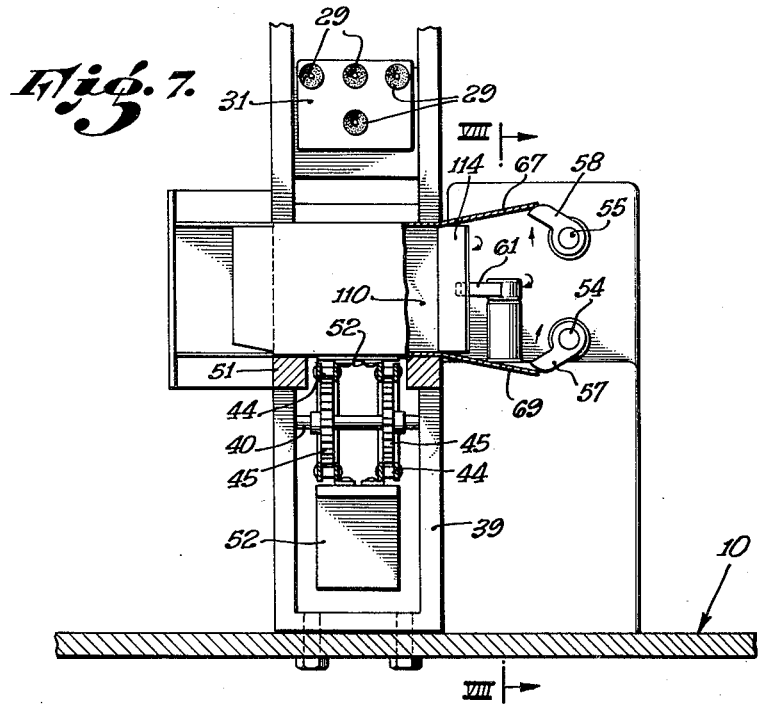
Fig. 7 is a sectional view taken along the line VII—VII of Fig. 1.
Figure 8:
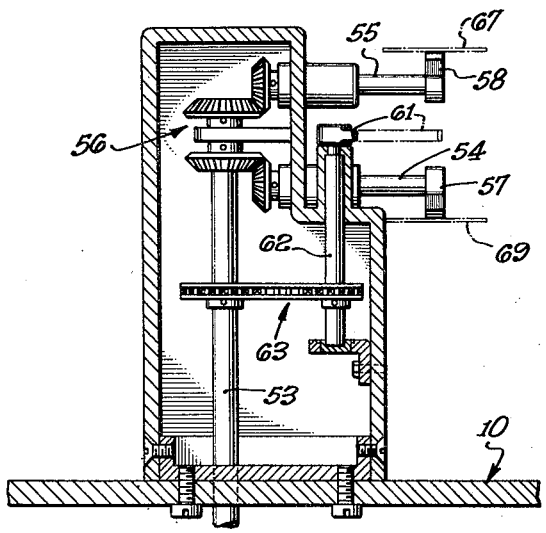
Fig. 8 is a sectional view taken along the line VIII—VIII of Fig. 7.

Figs. 14 to 19, inclusive, are perspective views of a carton illustrating the different steps in the opening of the carton and the folding of the flaps forming one end of the carton.

Fig. 20 is a diagrammatic view of the piping arrangement showing one manner of connecting the cam-actuated valves and associated cylinders, and Fig. 21 is a side elevational view of a modified form of a carton magazine.

Referring to the drawings, the numeral 10 indicates a supporting structure mounted on legs 11. An air supply, represented in its entirety by 12, may be carried by the structure 10 from which the several cylinders, later to be described, are actuated. An electric motor 13 supplied with current from any suitable source is adapted for continuous operation and drives a cam shaft 14 by way of reduction gears 15 and an electrically operated, one-revolution clutch 16. The cam shaft 14 is provided with cams 17, 18 and 19 for actuating air valves 21, 22 and 23, respectively. The air valves 21, 22 and 23 are connected in air lines 20 (see Fig. 21) for supplying air under pressure to and from air cylinders 24, 25 and 26, respectively, in response to cams 17, 18 and 19.

The valve 21 also controls an air line 30 supplying air under pressure to an air cylinder 27, the latter being employed to advance a follower 28 for feeding cartons, one at a time, to suction cups 29 carried by the face of a head member 31 mounted on the inner end of piston rod 32 extending through the cylinder 24. The cam 17 operates valve 21 to energize the cylinders 24 and 27 simultaneously. The cylinder 24 extends the suction cups 29 into contact with one side of a collapsed carton in a stack 33 and simultaneously the cylinder 27 advances the stack 33 one notch on the rack 93 and presses the forward carton into engagement with the suction cups 29, at which time the valve 21 operates to retract the head 31 into its normal out-of-the-way position, as shown at 35 in Fig. 6. During the return stroke of head 31, the cam 18 operates to actuate valve 22 for energizing cylinder 25 and forcing the head 36 on the lower end of piston rod 37 downwardly and into contact with the upper edge of the horizontally disposed carton which has been partly opened by contact with the inclined guides 38 carried by the vertical frame member 39. The suction cups 29 are supplied with a continuous regulated suction by way of the bore 41 through the center of piston rod 32. The bore 41 connects with bores 42 in the head 31 which connects with the suction cups 29.

The head 36 is provided with a downwardly extending projection 43 for engaging the upper edge of the carton as it is pressed downwardly and onto a conveyor 44. The conveyor 44 may be of the sprocket wheel-and-chain type and consist of a pair of spaced sprocket wheels 45 carried by shafts 40. The shafts are located at the ends of the conveyor 44 and rotatably supported in pillow blocks 46, carried by the lower surfaces of spaced, longitudinal, parallel frame members 47. The frame members 47 are supported at their ends by vertical frame members 48 carried by and extending upwardly from the supporting structure 10. A passageway 49 for the carton is provided through the machine and is defined by the horizontal frame members 47 and vertically spaced parallel frame members 51 disposed above the members 47. The opposing inner surfaces of the frame members 47 and 51 define a space of substantially the dimensions of the open carton body, as clearly shown in Figs. 9 to 11, inclusive.

The conveyor 44 is provided with spaced pusher plates 52 for conveying the carton through the passageway 49. The plates 52 are spaced apart the distance that the conveyor travels during one revolution of the cam shaft 14. At the instant when a pusher plate 52 contacts the newly opened carton, the cam 18 actuates the air valve 22 for retracting the head 36 associated with cylinder 25, and simultaneously the cam 19 actuates the air cylinder 26 to oscillate the shaft 53. The piston rod of the cylinder 26 is connected to the lower end of the shaft 53 by a rack carried by the piston rod and gear carried by and fixed to the lower end of the shaft 53. Upon oscillation of the shaft 53, stub shafts 54 and 55 are simultaneously oscillated in opposite directions by the gear arrangement, represented in its entirety by 56. The free ends of the shafts 54 and 55 are provided with fingers 57 and 58, respectively, which operate to open the upper and lower flaps of the bottom of the carton, while a finger 61 carried by the upper end of a vertical shaft 62 is simultaneously oscillated by way of a sprocket and chain mechanism 63 connecting shaft 53 with shaft 62.

The finger 61 operates to fold the adjacent side flap inwardly as the carton is carried forward by the pusher plate 52. As the carton is moved forwardly, the oposing side flap is engaged by the inner guide surface 64 of a flap-folding plow, represented in its entirety by 65, and folds over the opposing flap. The plow 65 is arranged to interlock the tab 66 of the upper flap 67 with the slit 68 in the lower flap 69. The folding plow or flap interlocking means 65 consists of an inner, preformed, elongated member 71 varying in cross section throughout its length, and a pair of flap folders consisting of upper and lower arcuate-shaped, elongated plates 72 and 73, respectively, spaced from the member 71. At the entrance to the means 65, the plates 72 and 73 are spread apart as shown at 74 in Fig. 3. The curved plates 72 and 73 may have one of their longitudinal edges fixed to frame members 47 and 51, respectively, and their free longitudinal edges gradually curving inwardly toward one another and toward the member 71. The lower plate initially curves inwardly ahead of upper plate 73 in order to position the lower flap 69 beneath the upper flap 67 and as the free ends of the flaps are brought into overlapping relation, the upper plate 73 becomes narrower and curves inwardly ahead of the lower plate 72, as shown in Fig. 11, pressing the free end of the lower tab 69 inwardly and causing the slit 68 to open for receiving the tab 66 of the upper flap 67. As the carton progresses through the means 65, the plates flatten in shape to press the interlocking tab in superimposed contact with the side flap and forming a complete closure for the bottom of the carton.

At the other end or top of the carton, the upper and lower flaps extend between guide rods 76 and the upper and lower frame members 47 and 51. Upper and lower deflectors 77 and 78 may also be provided for maintaining the flaps in the desired open position. The guides 76 press the inner side flap 115 inwardly, and the outer side flap 116 outwardly. The side flaps 115 and 116, together with the end vertical edges 117 of the top of the carton, form a slide support for positioning the carton within the passageway 49 and holding the vertical edges of the bottom of the carton in sliding relation with the guide surface 64 of the member 71.

The carton moves along the passageway 49 and into a trough 81. One side of the trough is inclined as shown at 82, and the other side is curved as shown at 83, so that as the top end of the horizontal carton moves along the upwardly inclined surface 82, the carton will be turned 90° to its upright position and pass along the trough to such disposition as may be provided.

The conveyor 44 is driven at a predetermined rate of speed by a sprocket 85 carried by the cam shaft 14. The sprocket 85 is connected to a sprocket 86 carried by a horizontal shaft 87 by a chain 88, a vertical shaft 89 connected to the horizontal shaft 87 and a reduction gear means 91 connecting the upper end of vertical shaft 89 with shaft 40 on which one set of the sprocket wheels 46 is mounted.

The conveyor 44 travels the distance defined by the space between the pusher plates 52 during one revolution of the cam shaft 14.

The stack of cartons 33 may be arranged in a magazine 92 disposed above the passageway 49 and carried by the longitudinal frame members 51. The follower 28 is provided in the magazine and is mounted on a rack 93 having teeth spaced apart the distance of the thickness of one collapsed carton. The follower 28 is supported at its bottom by a horizontal member 94, the latter having a downwardly extending pawl or tooth 95 which engages the rack 93 and at its top by a horizontal member 96 pivotally connected to the follower 28 as shown at 97. The free end of the member 96 is provided with a handle 98 for adjusting the position of the follower 28 in the magazine 92. Adjacent the handle 98, the member 96 is pivoted to the top of a vertical member 99. The member 99 extends downwardly and through a slot in the free end of member 94 and terminates in a tooth 101 for engaging the rack 93. The members 94, 96 and 99 form with the follower 28 a substantially rectangular frame in which is mounted the air cylinder 27. The cylinder is carried centrally of the follower 28, and the piston rod projecting from the cylinder is fixed to the member 99 as shown at 102. The lower-toothed end of member 99 is biased toward the follower 28 by spring 103.

It can now be understood that when air enters the cylinder 27 by way of port 104, the piston in the cylinder 27 is held against movement by member 99, the lower end of which is interlocked with the rack 93. Therefore, the follower will be pushed forward by relative movement of the cylinder 27 with the stationary piston, the pawl 95 of member 94 sliding one notch on the rack 93. Upon release of air pressure in the cylinder 27, the spring 103 will bring the member 99 one notch on the rack toward the follower 28 and in position for the next operation.

Fig. 21 illustrates a modified form of the carton-containing magazine. In this modification the cartons are fed by gravity, the magazine being curved and inclined in order to provide a slideway 105 provided with side members 106, the side members 106 being held together by cross members 107. The lower end of the magazine may rest on the frame members 51 and the upper end supported by vertical frame member 108, resting on and projecting upwardly from the frame members 51.

Figs. 14 to 19, inclusive, show various stages of the carton during the opening of the carton and the closing of the bottom thereof, as pointed out above. The clutch 16 is an electrically operated, one-revolution clutch, while the motor 13 is adapted for continuous operation. The clutch 16 may be energized by any suitable switch means, generally indicated by 118 which may be actuated by the open cartons, the switch being positioned in order that the carton may actuate the same during the passage of each carton. Upon energizing the clutch 16, the cam shaft rotates, causing the cam 17 to actuate the cylinders 24 and 27 simultaneously, the cylinder 27 advancing the follower 28 one notch on the follower rack and the cylinder 24 reciprocating to cause the head 31 to advance the suction cups 29 engaging the side 110 of the first carton in the magazine. As the carton is moved toward the cylinder 24, the upper end of the carton 111 strikes the inclined guide member 38, causing the carton to bend about the scored portions 112 and partially opening the carton. Immediately thereafter, the valve 18 actuates the valve 22 for energizing the cylinder 25, causing the head 36 to reciprocate downwardly and forcing the carton into the carton-forming chamber, as indicated by Fig. 15. Thereafter, the cam 19 actuates the valve 23, energizing cylinder 26 for actuating the fingers 57 and 58 simultaneously in opposite directions and spreads apart the flaps 67 and 69, while simultaneously the finger 61 oscillates to fold the side flap 113 downwardly, at which time the conveyor plate 52 moves the carton forward, bringing the short flap 114 into contact with the lower surface 64 of the member 71, as indicated in Figs. 16 and 17. As the carton moves forward through the flap-folding plow, the upper and lower flaps are interlocked, as above described. The carton then passes on out the passageway 81, the inclined side 82 of the passageway 81 operating to set the carton in a vertical position.

While I have illustrated and described the preferred form of the present device, it will now be apparent to those skilled in the art that certain changes, additions, substitutions and modifications may be made in the exemplary form illustrated and described without departing from the spirit and scope of the appended claims.

We claim:

1. A mechanism for opening collapsed cartons including: a magazine for containing a supply of collapsed cartons, a conveyor having spaced pusher plates thereon, means including a shaft for driving said conveyor, a reciprocating means for withdrawing one collapsed carton at a time from said magazine, a second reciprocating means for disconnecting said carton from the first said means and placing it onto the conveyor in open position, flap manipulating means for opening oppositely disposed flaps and folding adjacent flaps and means responsive to the movement of the conveyor for folding and interlocking said oppositely disposed flaps.

2. A mechanism in accordance with claim 1, including cam means operatively connected to said driving means, wherein the first said means, second said means and manipulating means operate in timed relation and in response to one revolution of the said shaft.

3. A mechanism in accordance with claim 1, wherein the first and second said reciprocating means are arranged to reciprocate at an angle to one another.

4. A mechanism in accordance with claim 1, wherein the first said reciprocating means includes suction means.

5. A machine for forming cartons from preformed collapsed cartons having four joined sides, all sides being congruent with two of each sides disposed in the same plane and the other two likewise and in parallel relation with flaps extending from each side, a magazine for holding a supply of collapsed cartons having a discharge port arranged to present said cartons while the latter are in a vertical plane, horizontally movable suction means for grasping one of the sides of a carton, stationary means for deflecting the upper edge of the vertical carton during the horizontal movement thereof and separating the parallel sides, a conveyor, vertical reciprocating means for disengaging the carton from the suction means and placing the carton onto the conveyor in formed opened position, flap folding ploughs arranged to engage at least two of the flaps, and pusher means on the conveyor for moving the carton into engagement with the ploughs for interlocking the last mentioned flaps at one end of the carton.

6. A machine for forming cartons in accordance with claim 5, wherein the said horizontally movable means and said vertically reciprocable means includes fluid pressure means for actuation thereof.

7. A machine for forming cartons in accordance with claim 5, wherein the said magazine includes means for advancing the supply of collapsed cartons the distance of the thickness of one collapsed carton simultaneously with each actuation of said horizontally movable suction means.

8. A machine for forming cartons from preformed, collapsed cartons, wherein each pair of congruent carton sides lie in a common plane, said carton sides having flaps extending therefrom, a magazine for containing a supply of collapsed cartons and arranged too present said collapsed cartons while in a vertical plane with the flaps extending horizontally from said cartons, horizontally reciprocable suction means for grasping one of the sides of a collapsed carton and withdrawing the carton from said magazine, stationary means for separating the parallel sides of said carton during the withdrawal operation, a conveyor, vertically reciprocating means for disengaging the said carton from said suction means and placing said carton on said conveyor in formed open position with said carton disposed in a horizontal position, flap folding means and interlocking ploughs arranged to engage the flaps on one end of said carton and pusher means on said conveyor for moving at least two of the flaps into engagement with said plough for interlocking said last mentioned flaps on said one end and closing said one end of said carton.

9. A machine in accordance with claim 8, for presenting the open end of said carton for filling, wherein means is provided for setting said carton upright on said closed end.

10. A machine in accordance with claim 8, wherein said magazine includes means for advancing the said supply of cartons a predetermined distance during the actuation of said horizontally suction means.

11. A machine for forming cartons from preformed collapsed cartons having four joined sides, all sides being congruent with two of each sides disposed in the same plane and the other two likewise and in parallel relation with flaps extending from each side, a magazine for holding a supply of collapsed cartons having a discharge port arranged to present said cartons while the latter are in a vertical plane, means for advancing said collapsed cartons toward said discharge port, horizontally movable suction means for grasping one of the sides of a carton, stationary means for deflecting the upper edge of the vertical carton during the horizontal movement thereof and separating the parallel sides, a conveyor, vertical reciprocating means for disengaging the carton from the suction means and placing the carton onto the conveyor in formed opened position, flap folding ploughs arranged to engage at least two of the flaps, and pusher means on the conveyor for moving the carton into engagement with the ploughs for interlocking the last mentioned flaps at one end of the carton.

12. A machine in accordance with claim 11, wherein said horizontally reciprocating means, said vertical reciprocating means, and said advancing means are actuated in timed relation by fluid pressure means, the said fluid pressure means including means for simultaneously actuating said advancing means and said horizontal reciprocating means.

13. A mechanism for opening collapsed cartons including: a magazine for containing a supply of collapsed cartons, suction means for withdrawing one collapsed carton at a time from said magazine, reciprocating means for removing the carton from said suction means and opening the same, a conveyor for receiving the open carton, means including oscillating means for folding certain separated bottom flap portions of the carton to form a closed end, and means for driving the said conveyor, the last said means including means for actuating the said suction means and said reciprocating means in timed relation with said oscillating means.

14. A mechanism for opening collapsed cartons including: a magazine for containing a supply of collapsed cartons, suction means for withdrawing one collapsed carton at a time from said magazine, reciprocating means for removing the carton from said suction means and opening the same, a conveyor for receiving the open carton, means including oscillating means for folding certain separated bottom flap portions of the carton to form a closed end, and means operatively connected to said reciprocating and oscillating means for driving the said conveyor a predetermined distance prior to the actuation of the oscillating means.

CARLO RAY.
DON RAY.

REFERENCES CITED

The following references are of record in the file of this patent:

UNITED STATES PATENTS

| Number | Name | Date |
|---|---|---|
| 1,935,269 | Jones | Nov. 14, 1933 |
| 2,291,010 | Vergobbi | July 28, 1942 |
| 2,428,192 | Berch | Sept. 30, 1947 |